United States Patent
De France et al.

(10) Patent No.: US 9,106,062 B2
(45) Date of Patent: Aug. 11, 2015

(54) GEARED SPACER ASSEMBLY FOR CONDUCTOR BUNDLE

(75) Inventors: Robert Victor De France, Poughkeepsie, NY (US); Daniel David Dobrinski, Hillsboro, NH (US)

(73) Assignee: Hubbell Incorporated, Shelton, CT (US)

( * ) Notice: Subject to any disclaimer, the term of this patent is extended or adjusted under 35 U.S.C. 154(b) by 342 days.

(21) Appl. No.: 13/466,732

(22) Filed: May 8, 2012

(65) Prior Publication Data

US 2012/0305290 A1 Dec. 6, 2012

Related U.S. Application Data

(60) Provisional application No. 61/493,592, filed on Jun. 6, 2011.

(51) Int. Cl.
*H02G 7/12* (2006.01)

(52) U.S. Cl.
CPC ............ *H02G 7/12* (2013.01); *Y10T 29/49947* (2015.01)

(58) Field of Classification Search
CPC .......... H02G 7/00; H02G 7/12; H02G 7/056; H02G 7/125
USPC ........... 174/40 R, 40 CC, 42, 146, 41, 43, 46, 174/147, 152 R
See application file for complete search history.

(56) References Cited

U.S. PATENT DOCUMENTS

| | | | | |
|---|---|---|---|---|
| 2,779,224 A | * | 1/1957 | Coggburn | 81/3.44 |
| 2,915,580 A | * | 12/1959 | Fletcher et al. | 174/43 |
| 2,974,184 A | * | 3/1961 | Mather | 174/40 R |
| 3,617,609 A | | 11/1971 | Tuttle | |
| 3,743,762 A | * | 7/1973 | Annas et al. | 174/146 |
| 3,924,055 A | | 12/1975 | Moore | |
| 3,963,855 A | | 6/1976 | Hawkins | |
| 4,012,582 A | | 3/1977 | Hawkins | |
| 4,525,596 A | | 6/1985 | Dianna | |
| 4,742,600 A | * | 5/1988 | Calmettes et al. | 24/20 R |
| 5,274,886 A | * | 1/1994 | Oetiker | 24/20 TT |
| 5,802,690 A | * | 9/1998 | Bullock | 29/237 |
| 6,199,459 B1 | * | 3/2001 | Azkona | 81/411 |
| 6,502,482 B1 | * | 1/2003 | Putsch et al. | 81/405 |
| 7,681,477 B2 | * | 3/2010 | Alexander | 81/411 |
| D653,103 S | * | 1/2012 | Tomasi et al. | D8/396 |
| 2007/0204729 A1 | * | 9/2007 | Lucke et al. | 81/412 |
| 2008/0173462 A1 | | 7/2008 | Whapham | |
| 2010/0064861 A1 | * | 3/2010 | Herrmann | 81/409 |
| 2012/0111156 A1 | * | 5/2012 | DeBaker et al. | 81/405 |

* cited by examiner

*Primary Examiner* — Ishwarbhai B Patel
*Assistant Examiner* — Paresh Paghadal
(74) *Attorney, Agent, or Firm* — Michael Best & Friedrich, LLP

(57) ABSTRACT

A spacer assembly includes first and second clamping bodies. The first clamping body has a first slot. The first slot has a first set of teeth. The second clamping body has a second slot. The fastener connects the first clamping body to the second clamping body. The fastener has a second set of teeth to engage the first set of teeth such that rotation of the fastener moves the first clamping body relative to the second clamping body.

17 Claims, 10 Drawing Sheets

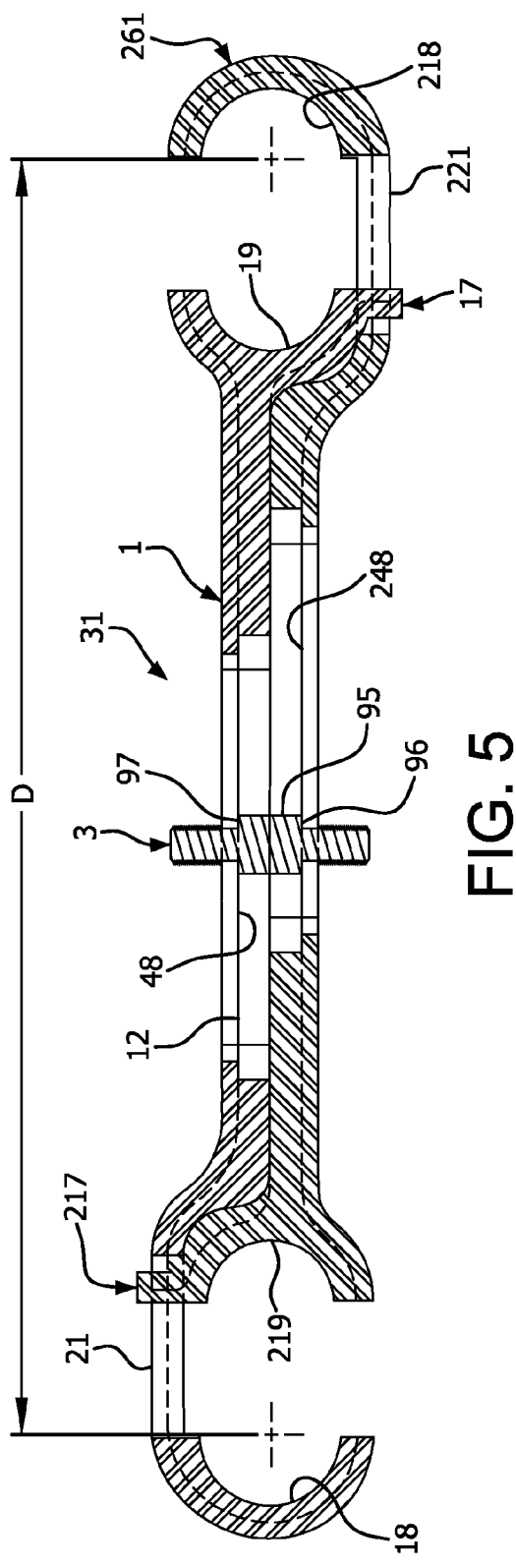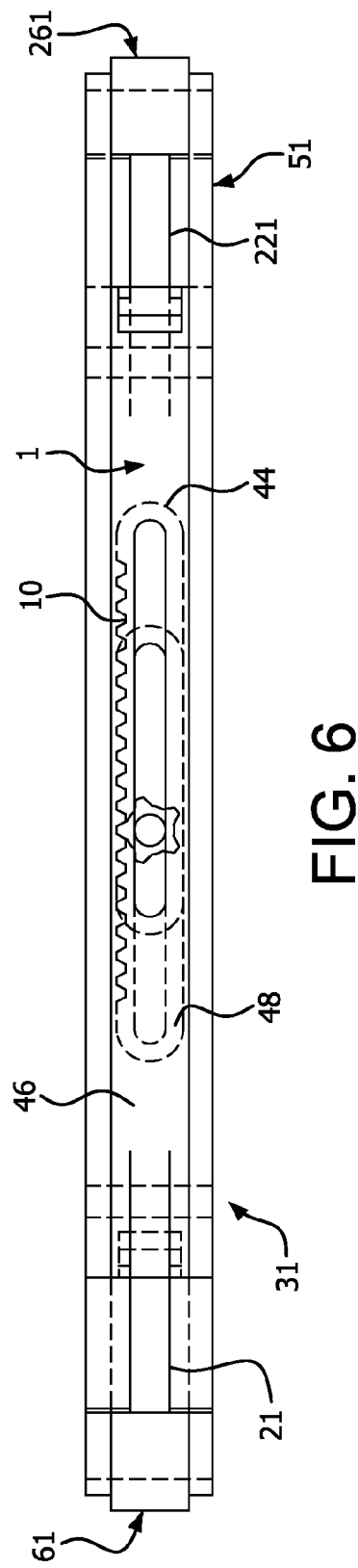
FIG. 5
FIG. 6

GEARED SPACER ASSEMBLY FOR CONDUCTOR BUNDLE

CROSS-REFERENCE TO RELATED APPLICATION

This application claims the benefit under 35 U.S.C. §119 (e) of U.S. Provisional Application Ser. No. 61/493,592, filed Jun. 6, 2011, which is hereby incorporated by reference in its entirety.

U.S. patent application Ser. No. 13/473,987, filed May 17, 2012, and entitled SPACER ASSEMBLY FOR CONDUCTOR BUNDLE, which claims the benefit under 35 U.S.C. §119(e) of U.S. Provisional Patent Application Ser. No. 61/494,501, which was filed Jun. 8, 2011, discloses related subject matter and is hereby incorporated by reference in its entirety and is attached hereto.

FIELD OF THE INVENTION

The present invention relates generally to a spacer assembly for a conductor bundle. More particularly, the present invention relates to a geared spacer assembly for maintaining a minimum distance between received conductors. Still more particularly, the present invention relates to first and second clamping bodies of a spacer assembly having serrated portions to prevent movement of the first and second clamping bodies with respect to one another after installation.

BACKGROUND OF THE INVENTION

In the electrical utilities industry, conductor bundles can be used to transmit bulk power with reduced loss, thereby increasing transmission efficiency. A conductor bundle is a series of two, three or four conductors spaced apart by non-conducting spacers. Bundled conductors are used on high-voltage power lines to help reduce energy losses (due to the corona effect), audible noise and radio interference. As a result, the conductor bundles improve the power transmission process.

However, one disadvantage associated with conductor bundles is that they have higher wind loading. The spacers must maintain separation between the conductors of the bundle to prevent arcing, particularly during higher winds. Arcing can cause damage to equipment of the power distribution system. Accordingly, a need exists for a spacer assembly that facilitates maintaining separation between conductors.

Spacers for conductor bundles exist in which two spacer members are slid toward one another and then secured together to space apart received conductors. A fastener is used to secure the two spacer members together. A disadvantage associated with such spacers is that the fastener must be removed from at least one of the spacer members to allow the spacer members to slide with respect to one another when opening or closing the spacer. An operator in the field cannot secure the spacer members together if the fastener is dropped or lost. Accordingly, a need exists for a spacer for conductor members in which a fastener is not removed from either spacer member to open or close the spacer assembly.

Accordingly, a need also exists to provide a spacer assembly for a conductor bundle that is easy to install and maintains spacing between the conductors of the conductor bundle.

SUMMARY OF THE INVENTION

An object of the present invention is to provide a spacer assembly for a conductor bundle that maintains a predetermined spacing between conductors.

Another object of the present invention is to provide a spacer assembly that is quick and easy to install.

Another object of the present invention is to provide serrated portions on clamping bodies of the spacer assembly to prevent movement of the clamping bodies with respect to one another after installation.

The foregoing objects are basically attained by a spacer assembly including first and second clamping bodies. The first clamping body has a first slot therein. The first slot has a first set of teeth. The second clamping body has a second slot therein. The fastener connects the first clamping body to the second clamping body. The fastener has a second set of teeth to engage the first set of teeth such that rotation of the fastener moves the first clamping body relative to the second clamping body.

The foregoing objects are also basically attained by a spacer assembly including first and second clamping bodies. The first clamping body has a fastener receiving slot and a tab receiving slot. The fastener receiving slot has a plurality of teeth. Serrated portions are formed on opposite sides of the fastener receiving slot. A second clamping body is substantially identical to the first clamping body. A fastener secures the first clamping body to the second clamping body. The fastener has a plurality of teeth to engage the fastener receiving slot teeth of the first and second clamping bodies such that rotation of the fastener moves the first and second clamping bodies. The serrated portions of the first and second clamping bodies engage one another when the first and second clamping bodies are connected.

The foregoing objects are also basically attained by a method of spacing conductors in which a tab of a first clamping body is inserted in a slot of a second clamping body to movably connect the first clamping body to the second clamping body. A fastener received by the first and second clamping bodies is rotated in a first direction to rotate one of the clamping bodies towards the other clamping body to securely receive a conductor therebetween.

As used in this application, the terms "front", "rear", "side" and other orientational descriptors are intended to facilitate the description of the wedge dead end clamp assembly, and are not intended to limit the structure of the wedge dead end clamp assembly to any particular position or orientation.

Other objects, advantages, and salient features of the present invention will become apparent from the following detailed description, which, taken in conjunction with the annexed drawings, discloses a preferred embodiment of the invention.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 5 is a side elevational view in section of the spacer assembly of FIG. 4;

FIG. 6 is a top plan view of the spacer assembly of FIG. 4;

Throughout the drawings, like reference numerals will be understood to refer to like parts, components and structures.

DETAILED DESCRIPTION OF EXEMPLARY EMBODIMENT

Figure 1:
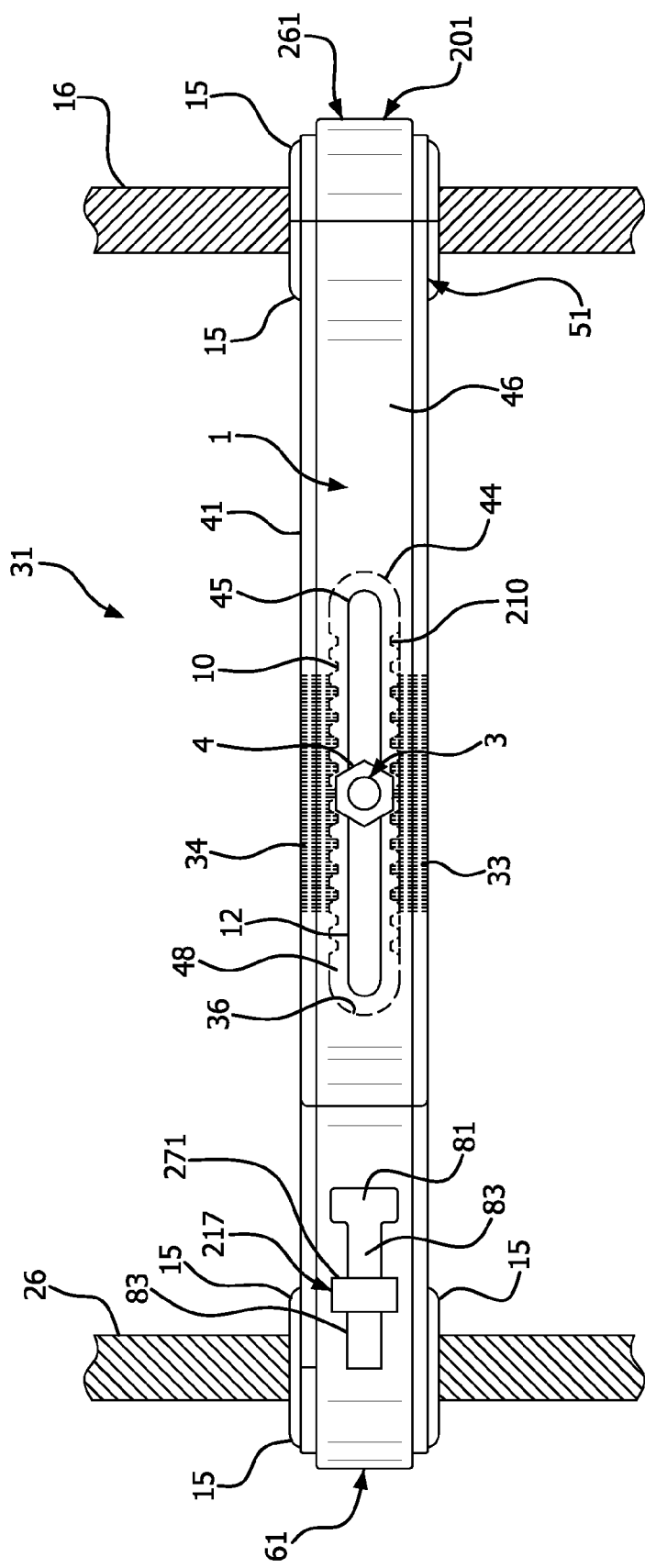
FIG. 1 is a top plan view of a spacer assembly in accordance with an exemplary embodiment of the present invention receiving two conductors.
Figure 2:
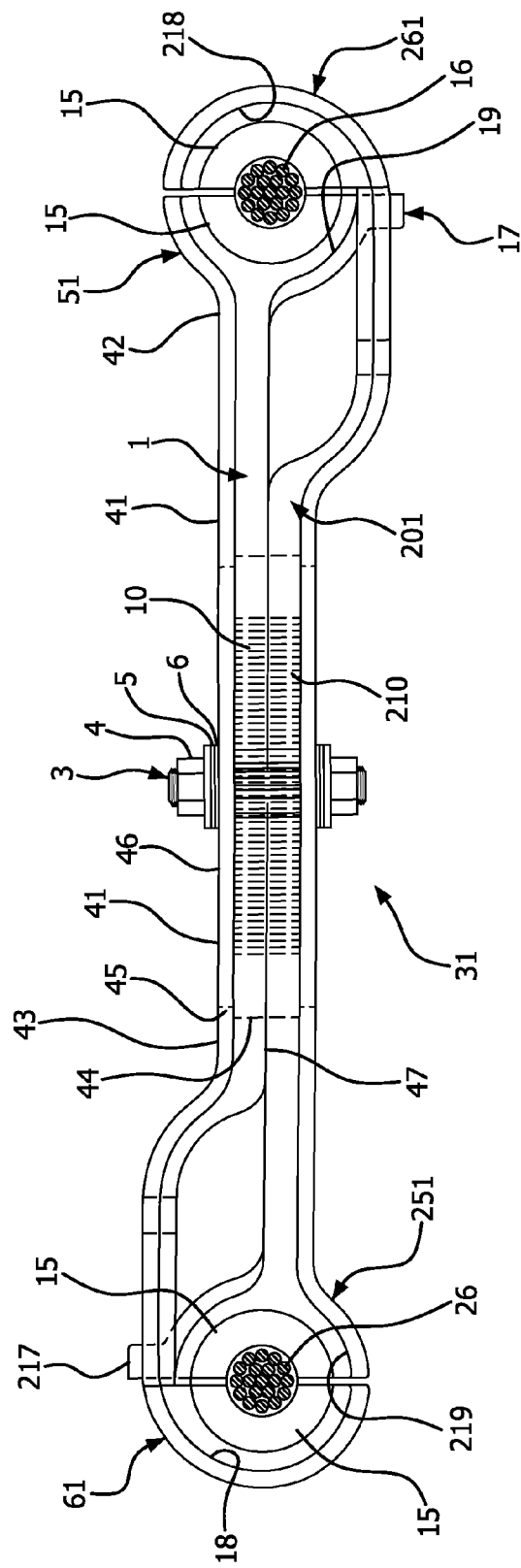
FIG. 2 is a side elevational view in partial cross section of the spacer assembly of FIG. 1.

In an exemplary embodiment of the present invention shown in FIGS. 1-13, a spacer assembly 31 is adapted to receive first and second conductors 16 and 26 and maintain a fixed spacing therebetween. As shown in FIGS. 1 and 2, the conductors 16 and 26 are not insulated. Accordingly, maintaining a fixed spacing between the high voltage conductors 16 and 26 substantially prevents arcing and other dangerous electrical occurrences that can happen when the uninsulated high voltage conductors 16 and 26 move too close together. The spacer assembly 31 in accordance with the exemplary embodiment of the present invention maintains a fixed distance between the uninsulated high voltage conductors 16 and 26 to substantially prevent arcing and other dangerous electrical occurrences from happening.

Figure 7:
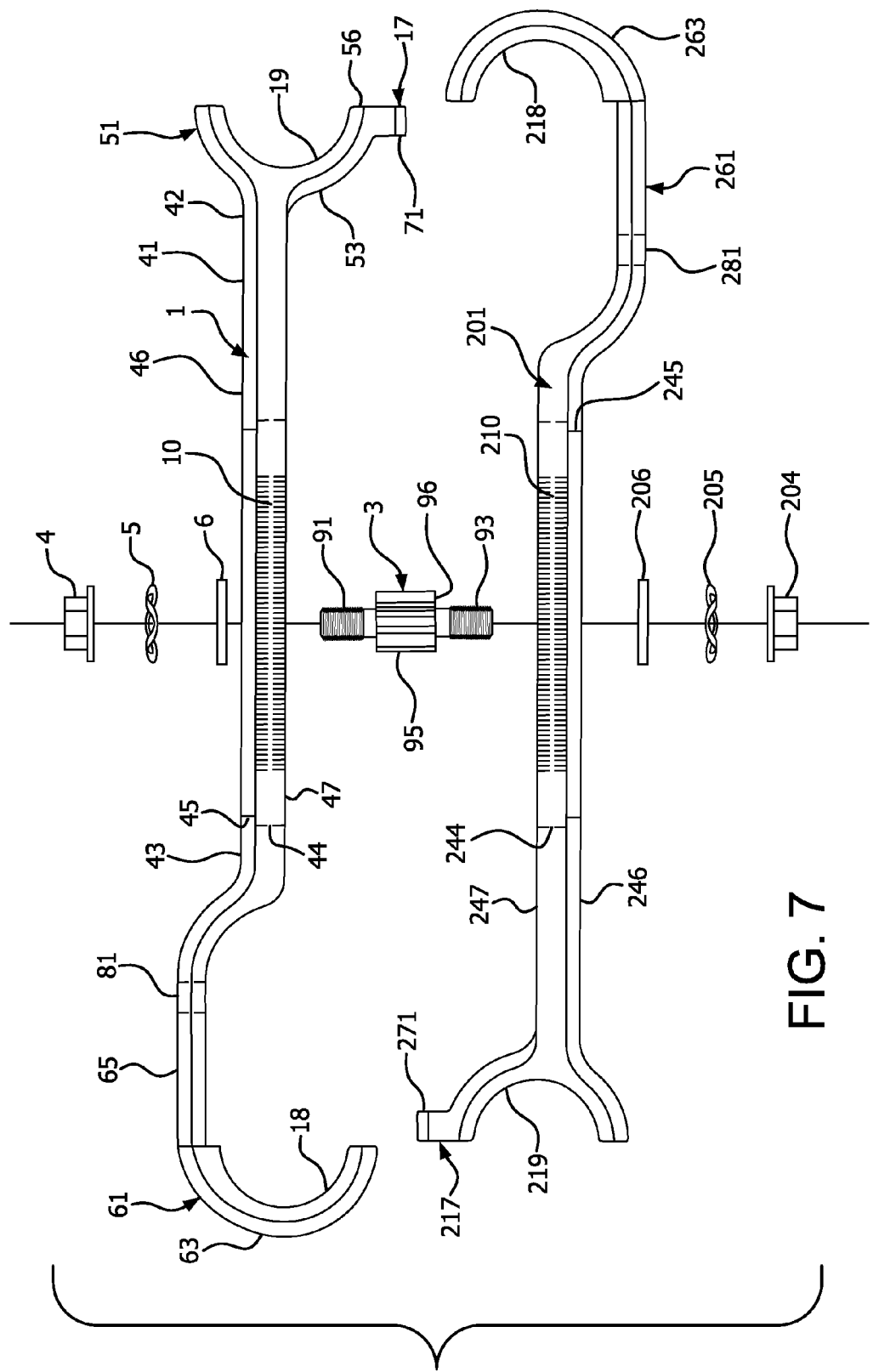
FIG. 7 is an exploded side elevational view of the spacer assembly of FIG. 1.
Figure 8:
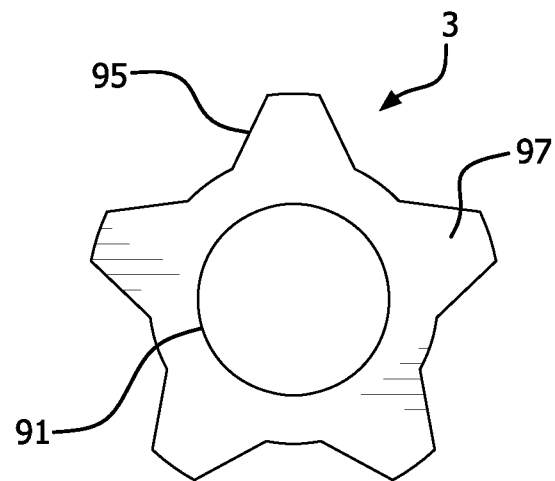
FIG. 8 is a top plan view of a gear bolt of the spacer assembly of FIG. 1.
Figure 9:
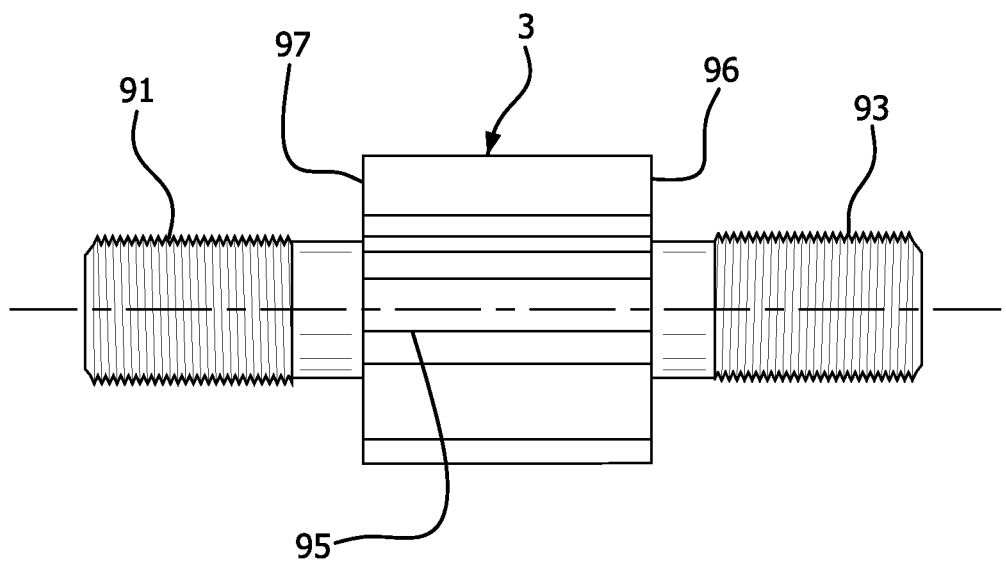
FIG. 9 is a side elevational view of the gear bolt of FIG. 8.
Figure 12:
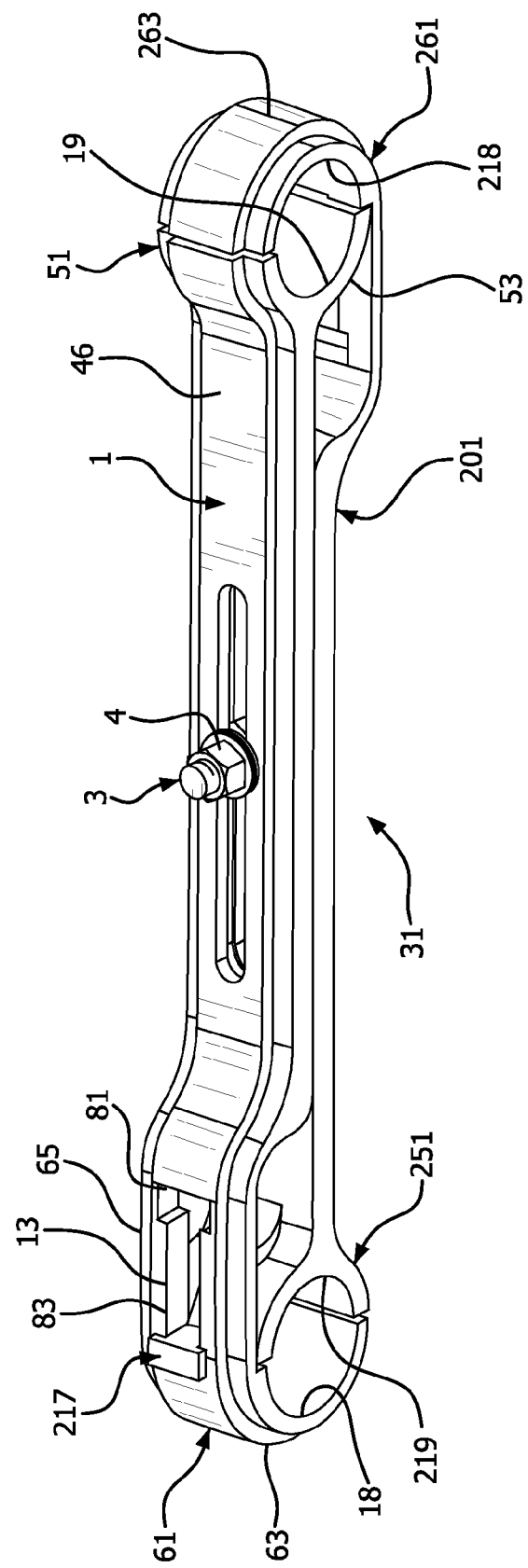
FIG. 12 is a perspective view of an assembled spacer assembly of FIG. 1 without the conductors.
Figure 13:
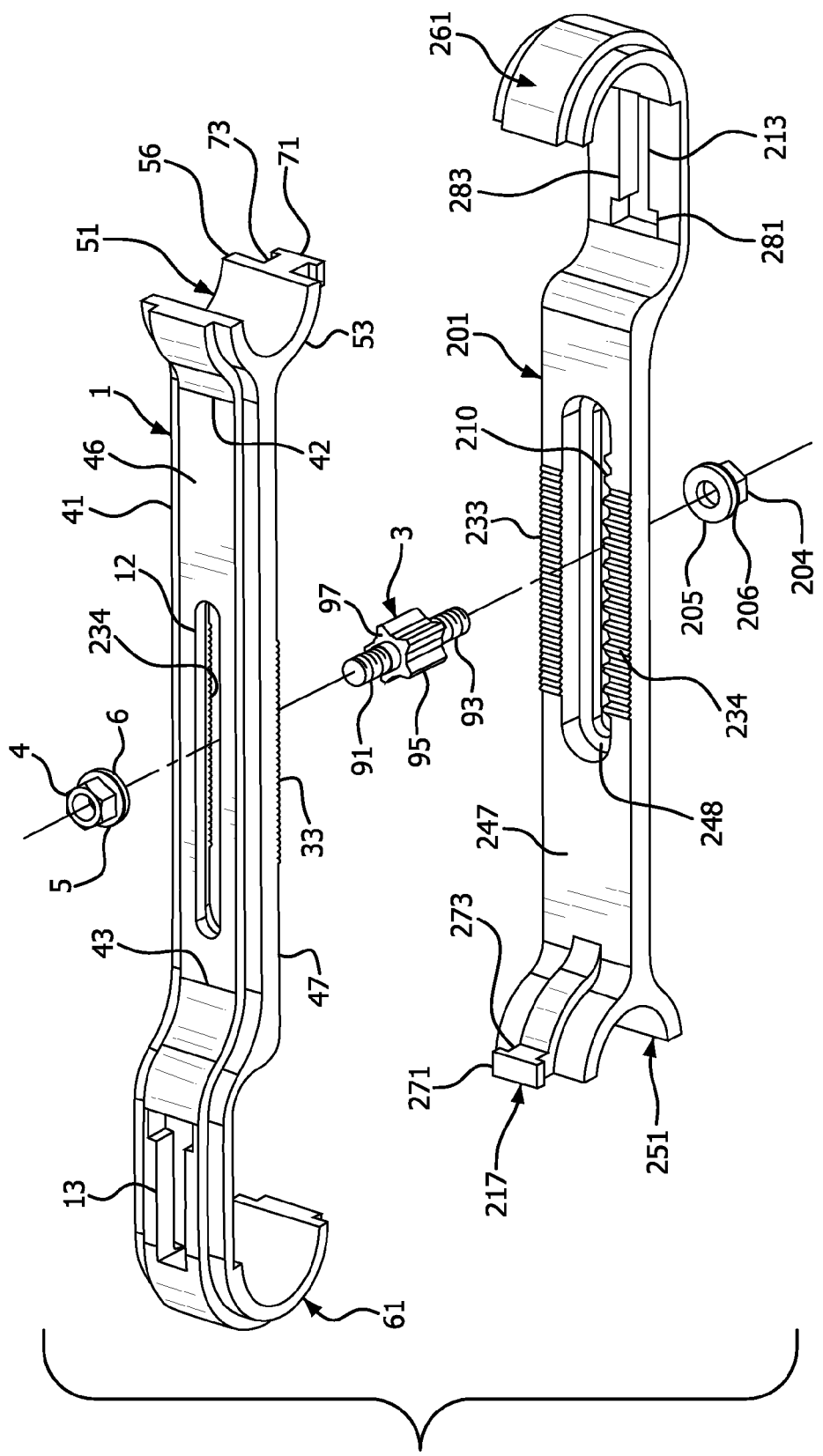
FIG. 13 is an exploded perspective view of the spacer of FIG. 1 without the conductors.

The spacer assembly 31 includes first and second clamping bodies 1 and 201, as shown in FIGS. 1-7, 12 and 13. Preferably, the first and second clamping bodies 1 and 201 are substantially identical, as shown in FIGS. 7 and 13. Similar components of the second clamping body 201 are identified with the same reference number as used to identify the components of the first clamping body 1, but the components of the second clamping body are identified with the 200 series (2xx, where xx is the reference number for the component of the first clamping body 1).

Figure 3:
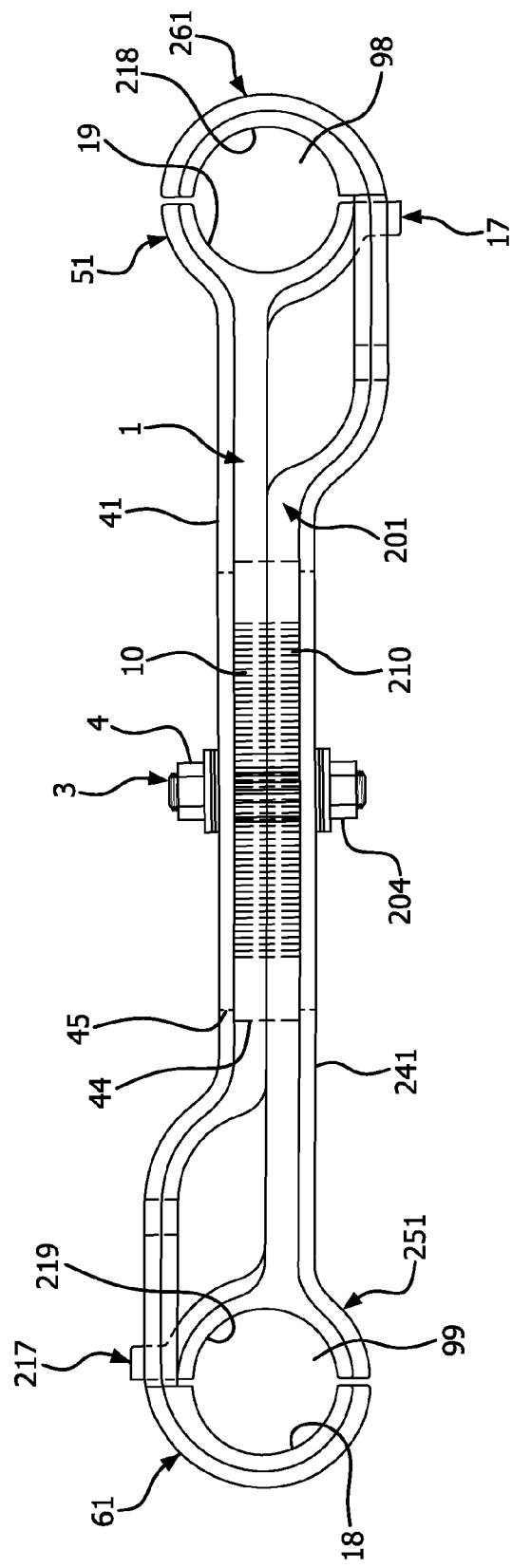
FIG. 3 is a side elevational view of the spacer assembly of FIG. 1 without the conductors.

The clamping body 1 has a substantially planar portion 41 having first and second ends 42 and 43 and upper and lower surfaces 46 and 47, as shown in FIGS. 2 and 7. A first conductor receiving portion 51 is formed at the first end 42 and a second conductor receiving portion 61 is formed at the second end 43, as shown in FIGS. 7 and 13. A first longitudinal slot 12 is formed in the planar portion 41 and extends from the upper surface 46 to the lower surface 47, as shown in FIGS. 5 and 13. The first slot 12 preferably has a substantially elongated shape with rounded ends in plan view. As shown in FIGS. 2, 3 and 7, the first slot 12 has an inner portion 44 and an outer portion 45. The inner portion 44 is proximal the lower surface 47 and the outer portion 45 is proximal the upper surface 46, as shown in FIGS. 2 and 7. Preferably, the inner portion 44 is longer and narrower than the outer portion 45, thereby forming a shoulder 48 therebetween as shown in FIGS. 1 and 6. The clamping body 1 is preferably integrally formed as a one piece member. The clamping body 1 is preferably made of aluminum, although any suitable non-conductive material may be used.

First and second serrated portions 33 and 34 are disposed on opposite sides of the first slot 12 on the lower surface 47 of the first clamping body 1, as shown in FIGS. 1 and 13. The serrated portions 33 and 34 are shown in phantom in FIG. 1. The serrated portions 33 and 34 extend preferably extend substantially perpendicular to a longitudinal axis of the first slot 12. A plurality of teeth 10 extend inwardly along an inner surface 36 of the inner portion 44 of the first slot 12 of the first clamping body 1. Preferably, as shown in FIG. 1, the teeth 10 extend inwardly along only one side of the inner portion 44 of the first slot 12. The first clamping body 1 has a first set of teeth 10. A second set of teeth 210 are formed in the second clamping body 201, as shown in FIG. 1. Alternatively, only one of the first and second clamping bodies 1 and 201 has gear teeth 10 formed thereon to engage the fastener 3.

The first conductor receiving portion 51 is connected to the first end 42 of the planar portion 41 of the clamping body 1, as shown in FIGS. 2, 7 and 12. The first conductor receiving portion 51 has a first arcuate portion 53 having an inner surface 19 adapted to engage the conductor 16. The inner surface 19 faces away from the planar portion 41. A locking member 17 extends outwardly from a free end 56 of the first arcuate portion 53.

The locking member 17, as shown in FIG. 13, has a tab 71 and a first connecting arm 73 connecting the tab 71 to the free end 56 of the first arcuate portion 53. Preferably, the first connecting arm 73 is substantially perpendicular to the planar portion 41 of the first clamping body 1, as shown in FIG. 7. The tab 71 is preferably substantially perpendicular to the first connecting arm 73.

The second conductor receiving portion 61 is connected to the second end 43 of the planar portion 41 of the clamping body 1, as shown in FIGS. 2, 7 and 12. The second conductor receiving portion 61 has a second arcuate portion 63 connected to the planar portion 41 by a second connecting arm 65. An inner surface 18 of the second arcuate portion 63 faces toward the planar portion 41 such that the inner surfaces 18 and 19 face the same direction.

As shown in FIGS. 1, 12 and 13, a second longitudinal slot 21 is disposed in the second connecting arm 65. The second slot 21 is preferably substantially T-shaped having a first portion 81 and a second portion 83. The first portion 81 is substantially perpendicular to the second portion 83, as shown in FIG. 1. The first portion 81 has a width larger than tab 271 that allows the tab 271 of the locking member 217 of the second clamping body 201 to pass therethrough. The second portion 83 has a width less than that of tab 271 preventing tab 271 from passing therethrough.

Figure 10:
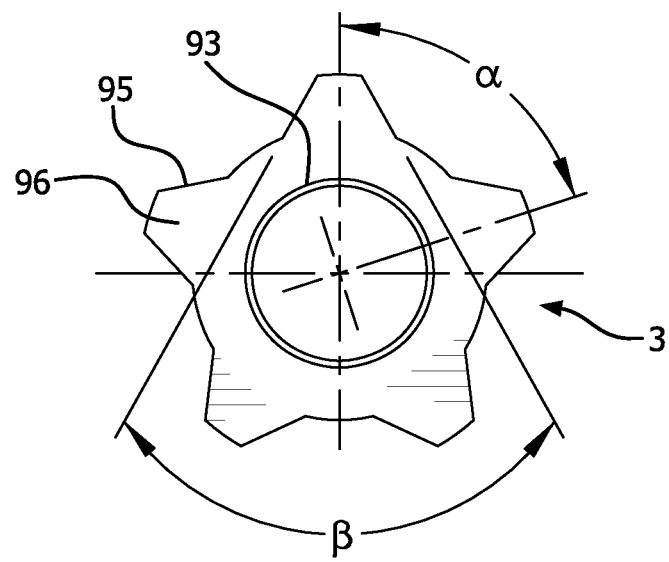
FIG. 10 is a top plan view of the gear bolt of FIG. 8 illustrating a tooth angle.
Figure 11:
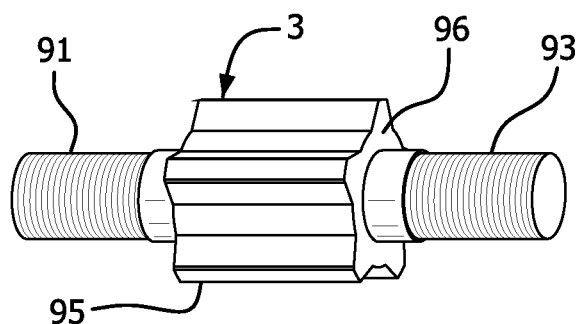
FIG. 11 is a perspective view of the gear bolt of FIG. 8.

The fastener 3, as shown in FIGS. 8-11, secures the first and second clamping bodies 1 and 201 together. The fastener 3 has a first threaded portion 91 disposed at one end of the fastener 3 and a second threaded portion 93 disposed at the other end. Gear teeth 95 are disposed between the first and second threaded portions 91 and 93 and extend circumferentially around the fastener 3 with an angle $\alpha$ between adjacent teeth 95. Preferably, there are five teeth 95 with an angle of approximately 75 degrees between adjacent teeth. Each tooth has an included angle $\beta$, as shown in FIG. 10, which is preferably approximately 60 degrees. The teeth 95 are adapted to engage the teeth 10 and 210 of the first and second clamping bodies 1 and 201. After the fastener 3 is inserted in the slot 12 to secure the first and second clamping bodies 1 and 201 together, a flat washer 6, a spring washer 5 and a nut 4 are connected to the first threaded portion 91. A second flat washer 206, a second spring washer 205 and a second nut 204 are connected to the second threaded portion 93 of the fastener 3.

Assembly and Operation

Prior to assembling the spacer assembly 31, an insulating grommet 15 is disposed in each of the conductor receiving portions 18 and 19 of the arcuate portions 61 and 51 of the first and second clamping bodies 1 and 201, as shown in FIG. 2.

Each of the grommets 15 preferably has a semi-cylindrical shape and is secured to the respective conductor receiving portion with an adhesive. The insulating grommets 15 substantially prevent damage to the uninsulated conductors 16 and 26 received by the spacer assembly 31. Grommets of varying sizes can be used such that the spacer assembly 31 can accommodate conductors of different diameters.

As shown in FIGS. 1, 4, 12 and 13, the spacer assembly 31 is assembled by positioning the first clamping body 1 such that the second conductor 26 engages the grommet 15 disposed in the second conductor receiving portion 18 of the second arcuate portion 61 and the first conductor 16 is disposed in the first conductor receiving portion 19 of the first arcuate portion 51.

The fastener 3 is then inserted in the second clamping body 201 such that the lower surface 96 of the teeth 95 rest on the shoulder 248, as shown in FIG. 5. The fastener teeth 95 engage the clamping body teeth 210 of the second clamping body 201, as shown in FIG. 1. The flat washer 206, the spring washer 205 and the nut 204 are then disposed on the second threaded portion 93 of the fastener 3, as shown in FIGS. 2 and 7.

The second clamping body 201 is then connected to the first clamping body 1. Relative to the first clamping body 1, the second clamping body 201 is rotated 180 degrees about a longitudinal axis through the slot 212 and then 180 degrees about an axis perpendicular to the longitudinal axis through the slot 212. The second clamping body 201 is then positioned as shown in FIGS. 7 and 13 relative to the first clamping body 1. The first arcuate portion 251 of the second clamping body 201 forms a conductor receiving cavity 99 for the conductor 26 with the second arcuate portion 61 of the first clamping body 1, as shown in FIGS. 2 and 3. The second arcuate portion 261 of the second clamping body 201 forms a conductor receiving cavity 98 for the conductor 16 with the first conductor receiving portion 51 of the first clamping body 1, as shown in FIGS. 2 and 3.

Figure 4:
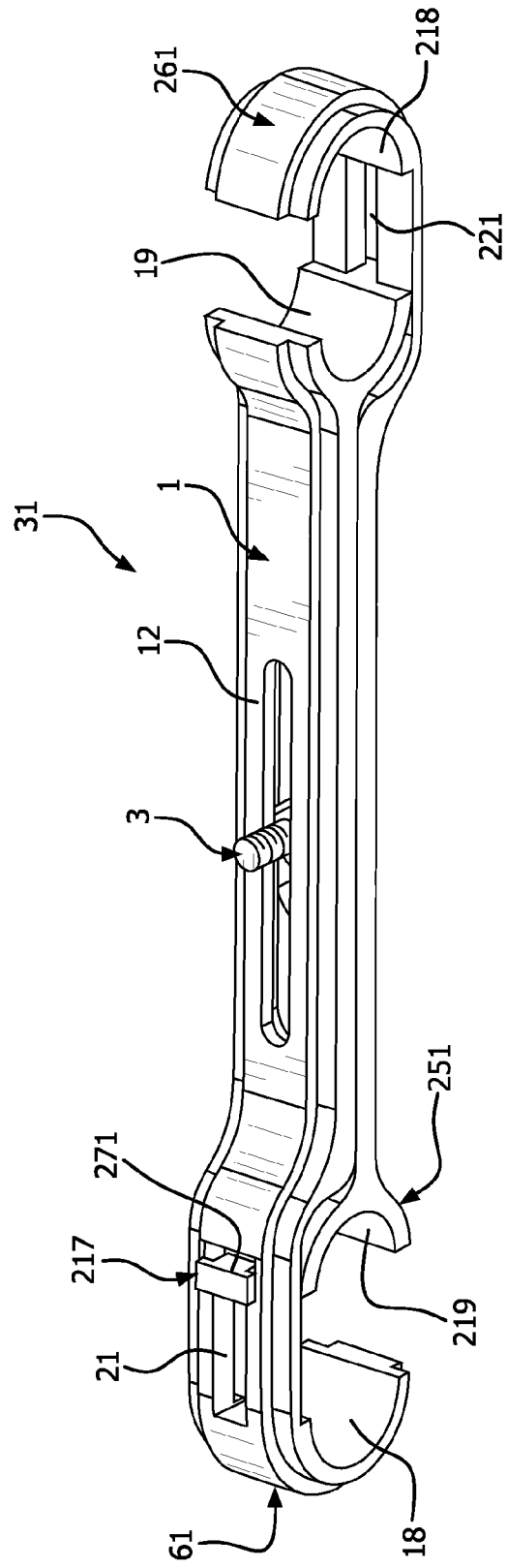
FIG. 4 is a perspective view of the spacer assembly of FIG. 1 without the conductors, nuts and washers.

The first and second clamping bodies 1 and 201 are aligned such that the tabs 71 and 271 are received by the first portions 81 and 281 of the second slots 21 and 221, as shown in FIGS. 1, 4 and 7. The first and second clamping bodies 1 and 21 are in a first position, as shown in FIGS. 4-6. As shown in FIG. 5, the distance D between the end of the second slot 21 in the first clamping body 1 and the end of the second slot 221 in the second clamping body 201 is preferably approximately twenty (20) inches. The fastener teeth 95 engage the slot teeth 10, as shown in FIGS. 1 and 6. The upper surface 97 of the teeth 95 abuts the shoulder 48 of the slot 12 of the first clamping body 1, as shown in FIG. 5. The flat washer 6, the spring washer 5 and the nut 4 are then disposed on the first threaded portion 91 of the fastener 3, as shown in FIGS. 2 and 7.

The first slots 12 and 212 allow for movement of the fastener 3 therein. The second slots 21 and 221 allow for movement of the locking members 17 and 217 therein. To securely retain the conductors 16 and 26 in the spacer 31, the fastener 3 is rotated. The rotation of the fastener 3 causes the fastener teeth 95 to engage the teeth 10 and 210, thereby linearly moving the first and second clamping bodies 1 and 201, which move in opposite directions because the clamping body teeth 10 and 210 are disposed on opposite sides of their respective slots as shown in FIG. 1. As the clamping bodies 1 and 201 move, the locking members 17 and 217 move in the second slots 21 and 221. This results in the conductor receiving portions 19 and 281 moving closer together and the conductor receiving portions 18 and 219 moving closer together, thereby securely retaining the conductors 16 and 26 therein, as shown in FIGS. 1 and 14.

The width of the tabs 71 and 271 of the locking members 17 and 217 is larger than that of the second portion 83 of the second slots 21 and 221, thereby further preventing separation of the first and second clamping bodies 1 and 201. The nuts 4 and 204 are tightened on the clamping bodies 1 and 201 after the clamping bodies have been moved to the second position, as shown in FIGS. 1, 2 and 14, thereby preventing movement of the clamping bodies with respect to one another. Additionally, the serrated portions 33, 34, 233 and 234 of the first and second clamping bodies 1 and 201 engage each other, thereby substantially preventing movement of the clamping bodies with respect to one another during and after installation of the spacer assembly 31. Thus, the serrated portions 33, 34, 233 and 234 also substantially prevent loosening of the clamping bodies 1 and 201 of the spacer assembly 31 during use.

Alternatively, only one of the clamping bodies has teeth 10 to engage teeth 95 of the fastener 3. Accordingly, rotation of the fastener 3 then only causes linear movement of the clamping body having the teeth.

The configuration of the spacer assembly 31 in accordance with the exemplary embodiments of the present invention provides a spacer assembly 31 that is easily installable by a single lineman. The spacer assembly 31 applies substantially equal pressure on both conductors 16 and 26. The spring washers 5 and 205 apply force on the clamping bodies that keep the serrated portions 33, 34, 233 and 234 engaged, thereby facilitating substantially preventing loosening of the clamping bodies 1 and 201 of the spacer assembly 31 during use.

The foregoing embodiments and advantages are merely exemplary and are not to be construed as limiting the scope of the present invention. The description of exemplary embodiments of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A spacer assembly, comprising:
    a first clamping body having a first slot therein, said first slot having a first set of teeth;
    a second clamping body having a second slot therein; and
    a fastener securing said first clamping body to said second clamping body, said fastener having a second set of teeth to engage said first set of teeth such that rotation of said fastener relative to said first and second clamping bodies moves said first clamping body along a length of said first slot relative to said second clamping body.

2. The spacer assembly according to claim 1, wherein said first and second clamping bodies are substantially identical.

3. The spacer assembly according to claim 2, wherein said second slot has a third set of teeth, said second set of teeth of said fastener engage said first and third sets of teeth of said first and second clamping bodies such that rotation of said fastener moves said first and second clamping bodies.

4. The spacer assembly according to claim 1, wherein
    a first serrated portion is disposed on an inner surface of said first clamping body; and
    a second serrated portion is disposed on an inner surface of said second clamping body, such that said first and second serrated portions engage one another when said first and second clamping bodies are connected.

5. The spacer assembly according to claim 4, wherein
a spring washer is disposed on each end of said fastener such that said spring washers abut outer surfaces of said first and second clamping bodies to bias said first and second clamping bodies towards one another.

6. The spacer assembly according to claim 3, wherein
said first and second slots have inner and outer portions, lengths and widths of said outer portions being less than that of said inner portions to facilitate receiving said fastener between said first and second clamping bodies.

7. The spacer assembly according to claim 1, wherein
said first clamping body has a first tab and a first tab receiving slot; and
said second clamping body has a second tab and a second tab receiving slot, said second tab being received by said first tab receiving slot and said first tab being received by said second tab receiving slot when said first and second clamping bodies are connected.

8. The spacer assembly according to claim 1, wherein
first and second conductor receiving portions are disposed at opposite ends of each of said first and second clamping bodies, said first conductor receiving portion of said first clamping body and said second conductor receiving portion of said second clamping body engage one another when said first and second clamping bodies are connected to receive a first conductor therein, said second conductor receiving portion of said first clamping body and said first conductor receiving portion of said second clamping body engage one another when said first and second clamping bodies are connected to receive a second conductor therein.

9. The spacer assembly according to claim 8, wherein
said first and second conductor receiving portions are substantially C-shaped.

10. The spacer assembly according to claim 9, wherein
said first and second conductor receiving portions face the same direction.

11. The spacer assembly according to claim 8, wherein
a grommet is disposed between said first and second clamping bodies and the received conductors to substantially prevent damage to the received conductors.

12. The spacer assembly according to claim 7, wherein
said first and second tab receiving slots have a first portion with a width larger than the first and second tabs, respectively, and a second portion with a width less than said first and second tabs, respectively.

13. A spacer assembly, comprising:
a first clamping body having a fastener receiving slot and a tab receiving slot, said fastener receiving slot having a plurality of teeth and serrated portions being formed on opposite sides of said fastener receiving slot;
a second clamping body substantially identical to said first clamping body; and
a fastener securing said first clamping body to said second clamping body, said fastener having a plurality of teeth to engage said fastener receiving slot teeth of said first and second clamping bodies such that rotation of said fastener relative to said first and second clamping bodies moves said first clamping body laterally relative to said second clamping body, and said serrated portions of said first and second clamping bodies engage one another when said first and second clamping bodies are connected.

14. The spacer assembly according to claim 13, wherein
a spring washer is disposed on each end of said fastener such that said spring washers abut outer surfaces of said first and second clamping bodies to bias said first and second clamping bodies towards one another.

15. The spacer assembly according to claim 13, wherein
said fastener receiving slots have inner and outer portions, lengths and widths of said outer portions being less than that of said inner portions to facilitate receiving said fastener between said first and second clamping bodies.

16. The spacer assembly according to claim 13, wherein
each of said first and second clamping bodies has a tab, said second clamping body tab being received by a tab receiving slot of said first clamping body and said tab of said first clamping body being received by said tab receiving slot of said second clamping body when said first and second clamping bodies are connected.

17. The spacer assembly according to claim 13, wherein
said tab receiving slot has a first portion with a first width and a second portion with a second width less than said first width.

* * * * *